US005967502A

United States Patent [19]

Dykstra

[11] Patent Number: 5,967,502

[45] Date of Patent: Oct. 19, 1999

[54] ENCLOSED PNEUMATIC CLAMP

[75] Inventor: Henry Dykstra, Hartland, Mich.

[73] Assignee: Delaware Capital Formation, Inc., Wilmington, Del.

[21] Appl. No.: 08/922,877

[22] Filed: Sep. 3, 1997

Related U.S. Application Data

[60] Provisional application No. 60/025,603, Sep. 4, 1996.

[51] Int. Cl.[6] .......... B23Q 3/08

[52] U.S. Cl. .......... 269/32; 269/228

[58] Field of Search .......... 269/32, 27, 228

[56] References Cited

U.S. PATENT DOCUMENTS 3,702,185 11/1972 Blatt .......... 269/32
3,760,451 9/1973 Steed .......... 15/250.02
5,118,088 6/1992 Sawdon .
5,165,670 11/1992 Sawdon .
5,171,001 12/1992 Sawdon .

*Primary Examiner*—Timothy V. Eley
*Assistant Examiner*—Benjamin M. Halpern
*Attorney, Agent, or Firm*—Dinnin & Dunn, P.C.

[57] ABSTRACT

A pneumatically powered clamp that completely encloses the actuating linkage assembly in a fluid-tight, lubricated environment. The clamp includes a pneumatic cylinder longitudinally and removably secured to a plastic body by brackets. The body has a bore to receive a piston rod, and a cavity in communication with the bore. The cavity allows room for the linkage assembly to be pivotally held and cooperate in the body. The bracket substantially seals the body needing only a nylon washer to establish a fluid-tight seal. The linkage means converts the linear motion of the piston rod into rotational motion in the clamp arms which are securely held outside the brackets.

6 Claims, 3 Drawing Sheets

ENCLOSED PNEUMATIC CLAMP (This application claims the benefit of provisional application Ser. No. 60/025,603, filed, Sep. 4, 1996)

TECHNICAL FIELD

The invention broadly relates to clamps for assembly and machining environments, and more particularly, to a pneumatically operated clamp with enclosed actuating mechanism.

BACKGROUND OF THE INVENTION

Power clamps are used in applications for holding workpieces during various operations in drilling, welding or machining stations. The typical power clamp is pneumatically or hydraulically powered to actuate clamp arms through a range of motion to hold a workpiece in place. Linkage components translate the motion of pneumatically or hydraulically powered pistons to clamp arms which are routinely exposed to the adverse environment of the welding or machining stations, particularly those contaminated with oil splatter, salt chips, coolants, dust and dirt, and other shavings or residue from drilling, welding or machining operations. Accordingly, with actuating parts exposed to such adverse environments, the contaminates interfere with the motion and cooperation of the actuating linkage to eventually cause the power clamps to fail.

Additionally, the typical powered clamp is designed with the majority of its structure being metal either die casted or machined. Consequently, the typical clamp is heavy and expensive to manufacture.

Wherefore, it is an object of the present invention to provide a design of a power clamp with an actuating linkage assembly that is sealed in a fluid-tight, lubricating environment protected from adverse environments.

Another object of the present invention is to provide a power clamp with a simple actuating design for easy maintenance and replacement of actuating components.

A further object of the present invention is to provide a design of a power clamp such that the individual components for the actuating linkage can be produced from a typical stamping process.

Still another object of the present invention is to provide a design of a power clamp that includes a light weight body.

Additional objects, advantages and novel features of the invention will be set forth in part in the description which follows, and in part will become apparent to those skilled in the art upon examination of the following or may be learned by practice of the invention. The objects and the advantages of the invention may be realized and obtained by means of the instrumentalities and combinations particularly pointed out in the appended claims.

SUMMARY OF THE INVENTION

According to the present invention, the foregoing and other objects and advantages are obtained by a pneumatically powered clamp that completely encloses the actuating linkage assembly in a fluid-tight, lubricated environment. The clamp includes a pneumatic cylinder longitudinally and removably secured to a plastic body by brackets. The body has a bore to receive a piston rod, and a cavity in communication with the bore. The cavity allows room for the linkage assembly to be pivotally held and cooperate in the body. The bracket substantially seals the body needing only a nylon washer to establish a fluid-tight seal. The linkage means converts the linear motion of the piston rod into rotational motion in the clamp arms which are securely held outside the brackets.

Figure 1:
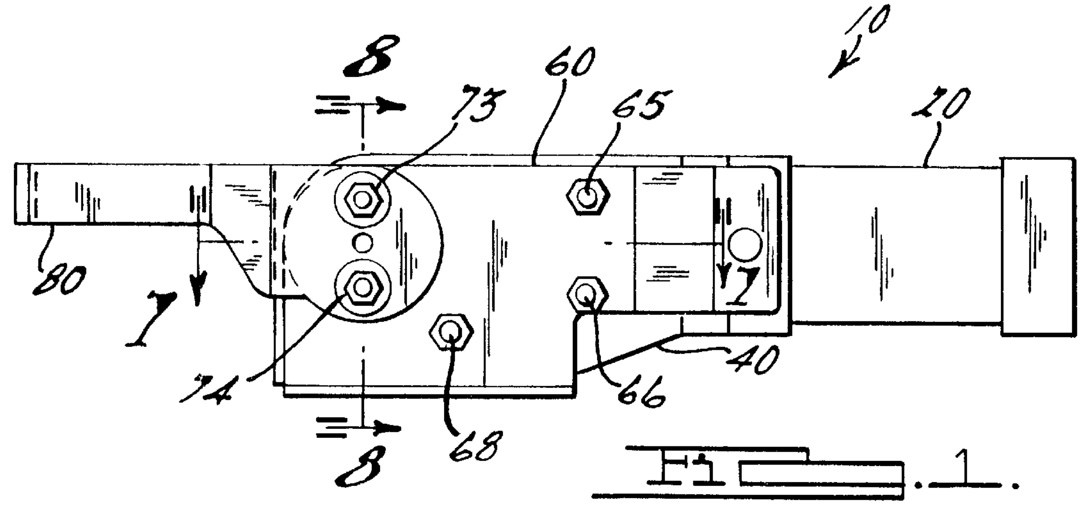
FIG. 1 is a side elevation view of the present invention in the clamped position.

BEST MODE IN CARRYING OUT THE INVENTION AND DESCRIPTION OF THE PREFERRED EMBODIMENT(S)

Referring now in greater detail to the drawings, FIGS. 1–9 illustrate the enclosed pneumatic clamp 10 of the present invention, and generally comprises a pneumatic cylinder 20 removably secured to a body 40 by brackets 60, 61. The body 40 and brackets 60, 61 enclose a linkage means that converts the linear motion of a piston rod 22 into rotational motion of a drive ratchet 52. Clamp arms 80, 81 are removably attached to the drive ratchet to rotate with the drive ratchet 52 and provide the clamping force on a workpiece (not shown).

Figure 4:
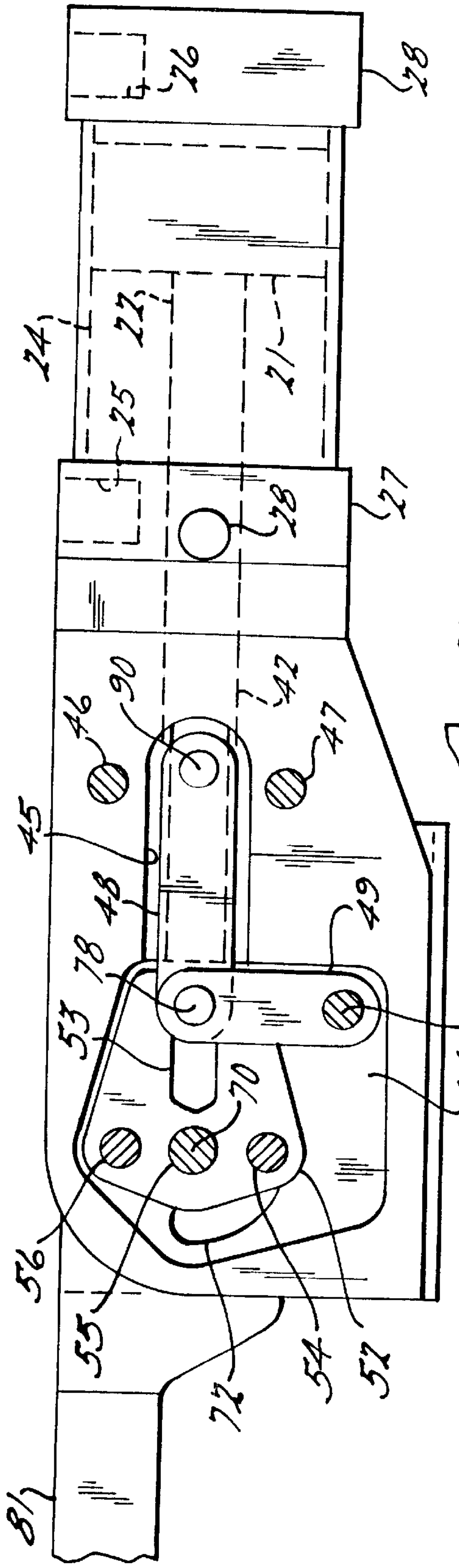
FIG. 4 is a longitudinal cross-sectional view taken along line 4—4 of FIG. 2.
Figure 5:
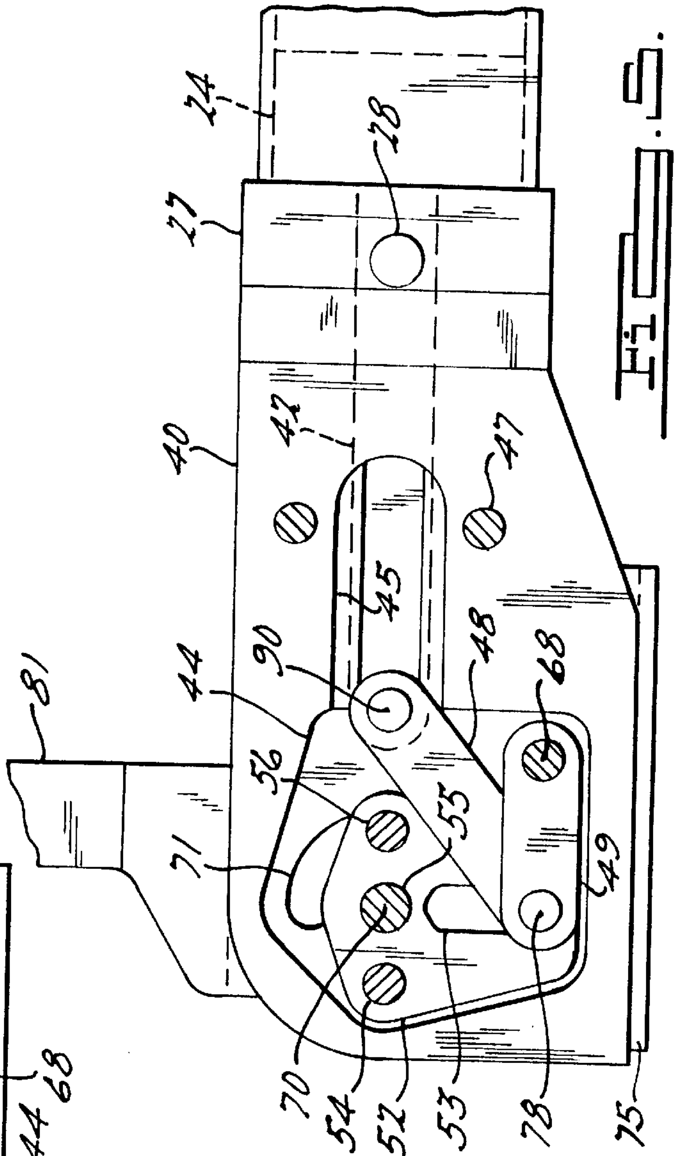
FIG. 5 is a longitudinal cross-sectional view similar to FIG. 4 with the clamp arm in the release position.
Figure 6:
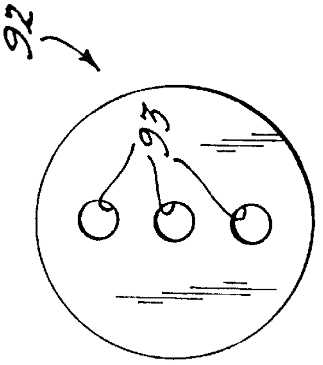
FIG. 6 is a side elevation view of the nylon washer for the present invention.

The pneumatic cylinder 20 has a fluid chamber 24 therein and a pair of fluid ports 25,26 (FIG. 4) longitudinally spaced in first and second cylinder heads 27, 28 respectively, which are in fluid communication with the fluid chamber 24. A piston 21 slidably held within the fluid chamber 24 is securely attached to the piston rod 22, the piston rod 22 extends longitudinally in the fluid chamber 24 through an opening (not shown) in the first cylinder head 27, as illustrated in FIGS. 4-5. The piston 21 is sealingly disposed for longitudinal movement within the fluid chamber 24 between the fluid ports 25, 26 in order to selectively retract (FIG. 4) and extend (FIG. 5) the piston rod 22 longitudinally in response to respective greater and lesser fluid pressures in one of the fluid ports with respect to the other fluid port.

Figure 2:
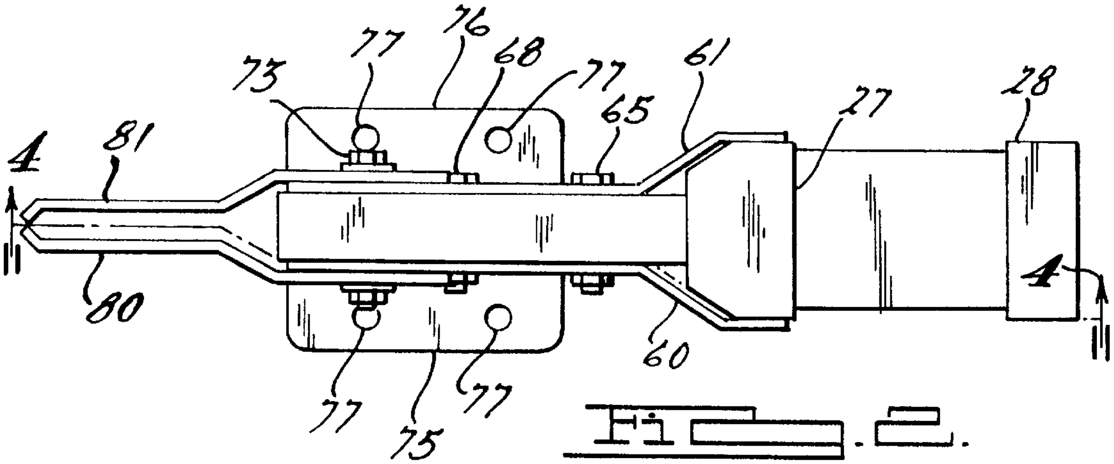
FIG. 2 is a top plan view of the present invention of FIG. 1.

FIGS. 4-5 demonstrate the body 40 includes a longitudinal bore 42 to receive the piston rod 22, and the bore 42 is in communication with a pentagonally-shaped cavity 44 open on both sides of the body 40. Longitudinal grooves 45 extend from the cavity 44 along opposite sides of the bore 42 to leave the bore 42 partially open. The body 40 is molded out of Delrin™ or other plastic such as polyurethane to reduce the weight of the clamp and to simplify the production of the body 40. FIG. 2 illustrates the dimension of the body 40 between the brackets 60, 61 is relatively narrow further reducing the weight of the clamp. Additionally, the small coefficient of friction between Delrin™ and the piston rod 22 allows the piston rod 22 to easily more through the bore 42 of the body 40 without any lubrication.

Figure 3:
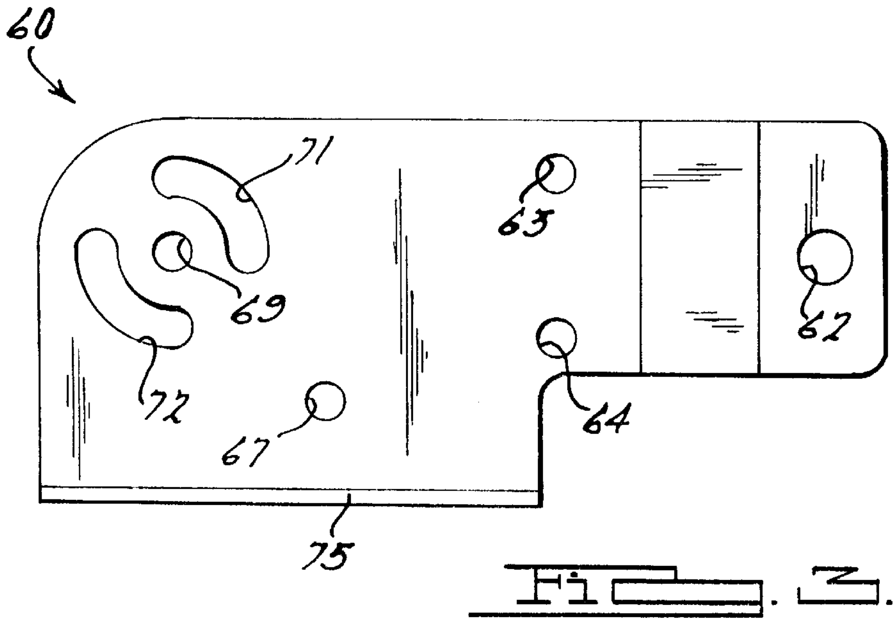
FIG. 3 is a side elevation view of the bracket for the present invention.

FIG. 3 illustrates one 60 of two brackets for the present invention that removably secures the body 40 to the cylinder head at a threaded opening 28 in the cylinder head 27 and substantially covers the bore 42 and cavity 44. Only a nylon washer 92 is needed, illustrated in FIG. 6, to fluidly seal the body. The brackets 60, 61 rest on opposite sides of the body 40. Each bracket has a first opening 62 to receive a first fastener (not shown), such as a bolt, to attach the brackets 60, 61 to the cylinder 20; second and third openings 63, 64 to receive second and third fasteners 65, 66, such as bolts (illustrated in FIGS. 1-2 and 7-8), each with a nut and held through openings 46, 47 in the body 40 to secure the brackets 60, 61 to the body 40; a fourth opening 67 to receive a fourth bolt 68 with a nut and a fifth opening 69 to receive the ends of a first-stepped pivot pin 70. Each bracket has a pair of circumferentially-spaced grooves 71, 72 extending generally for 90° in opposing quadrants with the fifth opening 69 at the center of the circumferentially-spaced grooves 71, 72. Each circumferentially-spaced groove receives a shoulder screw 73, 74 (FIGS. 1-2 and 7-8) to secure the clamp arms 80, 81 to the drive ratchet 52. The brackets 60, 61 further include a generally perpendicular portion 75, 76, shown in FIGS. 2-3, with openings 77 to receive securing means (not shown), such as bolts, to secure the clamp to a work station.

The linkage means is best illustrated in FIGS. 4-5, and includes a linearly-shaped drive link 48, a linearly-shaped anchor link 49, each having openings at the ends, and the drive ratchet 52. The drive ratchet 52 is pentagonally shaped with three openings 54, 55, 56 in alignment, two openings 54, 56 are positioned in two corners of the drive ratchet 52. The center opening 55 is held in alignment with the fifth opening 69 of the brackets 60, 61 by the first-stepped pivot pin 70 which pivotally connects the drive ratchet 52 to the brackets. The two outer openings 54, 56 of the drive ratchet 52 receive the shoulder screws 73, 74 to secure the clamps arms 80, 81 to the drive ratchet 52 adjacent the outer surface of the brackets. The drive ratchet 52 further includes a linear slot 53 having a longitudinal axis that is perpendicular to the line established by the three openings of the drive ratchet 52 and intersecting the center opening 55. The slot 53 receives a second-stepped pivot pin 78 (shown in FIG. 7) having a central portion hexagonally shaped to provide more point-contact area with the drive ratchet 52.

Figure 7:
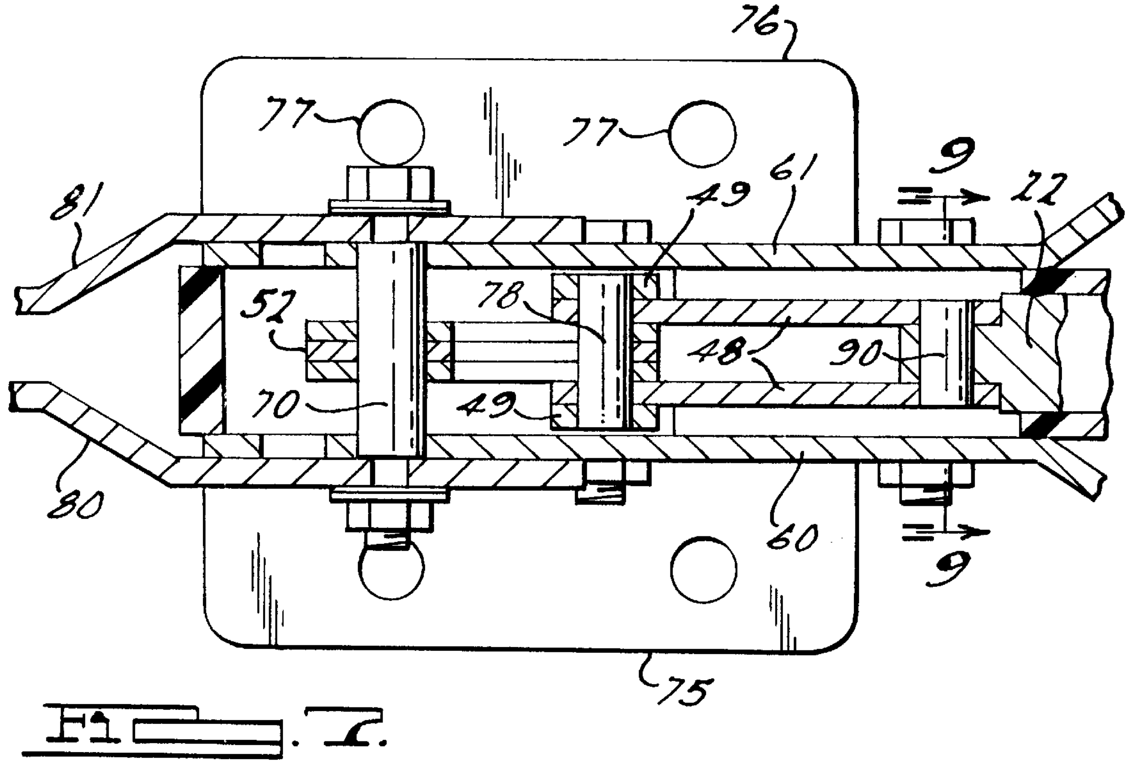
FIG. 7 is a cross-sectional view taken along line 7—7 of FIG. 1.
Figure 8:
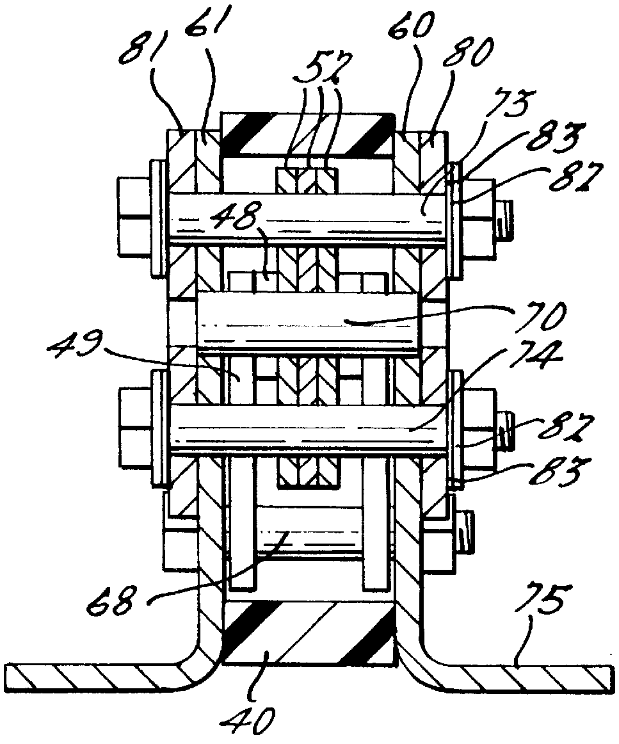
FIG. 8 is a cross-sectional view taken along line 8—8 of FIG. 1.
Figure 9:
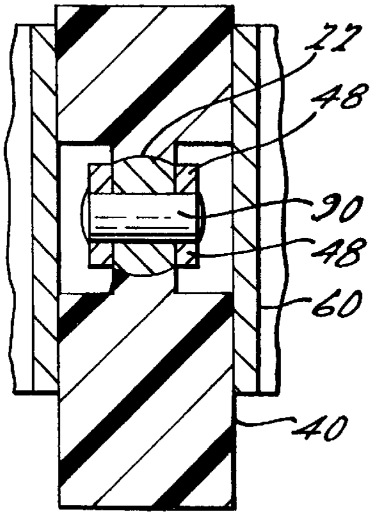
FIG. 9 is a transverse cross-sectional view taken along line 9—9 of FIG. 7.

FIGS. 4-5 and 7–9 illustrate the pivotal cooperation between the drive ratchet 52, anchor 49 and drive links 48, and piston rod 22. FIG. 9 demonstrates a pivot pin 90 pivotally connects and aligns first ends of two drive links 48 on opposite sides of the piston rod 22 at a first axis. In FIG. 7, with the piston rod 22 in the retracted position, the drive links 48 are longitudinally positioned adjacent the bore 42 in the adjacent grooves 45. The second-stepped pivot pin 78 pivotally connects and aligns first ends of two anchor links 49 on the outside of second ends of the two drive links 48 at a second axis. The second-stepped pivot pin 78 slidingly cooperates within the slots 53 of three aligned drive ratchets 52 effectively connecting the anchor 49 and drive links 48 to the drive ratchet 52 in pivotal cooperation at the second axis. The three drive ratchets 52 are aligned side by side in between the drive 48 and anchor links 49. The bolt 68 held in the fourth opening 67 of the brackets 60, 61 pivotally anchors the second end of the anchor link 49 to the brackets and establishes a third axis. The first-stepped pivot pin 70 held in the fifth opening 69 of the bracket 60, 61 pivotally anchors the drive ratchet 52 at the center opening 55 to the brackets and establishes a fourth axis.

The purpose for three drive ratchets is to have a thick enough load bearing surface not to require wear hardened surfaces nor require bushings, and yet during the manufacturing process to have a thin enough piece of metal that can be produced using a typical stamping technique without having to machine or die cast the piece. Additionally, the brackets, clamp arms, and drive and anchor links are also produced using the same typical stamping technique to reduce manufacturing costs and time needed to produce the components.

FIG. 4 illustrates the present invention with the piston rod 22 in the retracted position where the first, second and fourth axes establish a first plane perpendicular to a second plane established by the second and third axes. As the piston 21 experiences air pressure differentials within the fluid chamber 24 of the cylinder 20 , the piston 21 moves in the direction of the lesser fluid pressure, and in this illustration, begins to move the piston rod 22 into the extended position, as shown in FIG. 5, where the second and third axes establish a plane parallel to a plane established by the first and fourth axes.

During movement of the piston rod 22, axis one is moved longitudinally through the bore 42 while the second axis rotates about the third axis and simultaneously slides through the slot 53 of the drive ratchet 52 to rotate the drive ratchet 52 in a clockwise motion. The grooves 71, 72 in the brackets allow the shoulder screws 73, 74 to rotate with the drive ratchet 52 to selectively move the clamp arms 80, 81 into the clamped position of FIG. 4, and alternatively, the released position of FIG. 5. The shoulder screws 73, 74 are precisely stacked with suitable spacers 82 and wave or spring (or curved or belleville) washers 83 to provide proper tightening force between the clamp arms and brackets while permitting free rotation of the clamp arms.

The nylon washer 92 includes three openings 93 in a line, the outer two openings receive the shoulder screws 73, 74 with the center opening receiving the first-stepped pivot pin 70, and with the brackets 60, 61 create a fluid-tight seal with the body 40. Accordingly, the drive link 48, anchor link 49 and drive ratchet 52 are sealed from the environment allowing lubricating fluid such as grease to be directly added and contained therein without contamination during machining operations. Additionally, with the body 40 being molded from Delrin™, polyurethane or other durable plastics, and therefore, not requiring any lubricating fluid for the piston rod 22, this feature eliminates the necessity to continually add a lubricating fluid through the pneumatic system which can allow impurities to enter the actuating mechanism and cause the clamp to fail. Furthermore, the clamp operates to release the clamp arms from a workpiece when the piston rod is extending through the bore thereby using the stroke of greatest force during the release motion where there has been the most frequent binding of similar clamping mechanisms due to contaminates such as chips or shavings interfering the motion of the clamp arms.

It is understood the clamp arms could have any configuration necessary for a particular work piece requiring at least two openings to receive the shoulder bolts 73, 74. It is understood the brackets have inverted designs to facilitate alignment on opposite sides of the body. Additionally, it is understood the clamp could be hydraulically powered.

What is claimed is:

1. An enclosed fluid-actuated clamp comprising:

a cylinder having a fluid chamber therein and a pair of fluid ports longitudinaly spaced from one another in fluid communication with said fluid chamber;

a piston sealingly disposed for slidable longitudinal movement within said fluid chamber between said fluid ports in order to selectively move said piston longitudinally in response to respective greater and lesser fluid pressures in one of said fluid ports with respect to the other of said fluid ports;

a piston rod with a first end removably attached to said piston;

a housing removably secured to said cylinder, said housing having an enclosed longitudinal bore to receive a second end of said piston rod and an enclosed cavity communicating with said bore;

a linkage means pivotally connected to a second end of said piston rod and pivotally connected to the housing inside said cavity, said linkage means converts the longitudinal motion of the piston rod into rotational motion of a linkage member;

at least one clamp arm removably secured to said linkage member having at least a portion of said clamp arm cooperating outside said housing for rotational motion of said clamp arm; and said linkage means includes a drive link having a first pivotal connection to the second end of the piston rod at a first axis and a second pivotal connection to an anchor link at a second axis, said pivotal connection at the second axis slidingly cooperates with a drive ratchet in a linear slot, said anchor link having a second pivotal connection to said housing at a third axis, said drive ratchet further including a pivotal connection to said housing at a fourth axis, said linear slot is perpendicular to said fourth axis, said piston rod having a retracted position with the first, second and fourth axes establishing a plane perpendicular to a plane established by the second and third axes, and said piston rod having an extended position with the second and third axes establishing a plane parallel to a plane established by the first and fourth axes.

2. An enclosed fluid-actuated clamp comprising:

a cylinder having a fluid chamber therein and a pair of fluid ports longitudinally spaced from one another in fluid communication with said fluid chamber;

a piston sealingly disposed for slidable, longitudinal movement within said fluid chamber between said fluid ports in order to selectively move said piston longitudinally in response to respective greater and lesser fluid pressures in one of said fluid ports with respect to the other of said fluid ports;

a piston rod with a first end removably attached to said piston;

a body with a longitudinal bore to receive said piston rod and a cavity communicating with said bore;

two brackets on opposing sides of said body to removably secure the body to said cylinder and to fluidly seal said bore and cavity, each bracket having circumferentially-spaced grooves;

a linkage means pivotally connected to a second end of said piston rod and pivotally connected to the brackets inside the cavity of said body, said linkage means converts the longitudinal motion of the piston rod into rotational motion of a linkage member;

at least one clamp arm removably secured to said linkage member outside the brackets by a securing means cooperating through the circumferentially-spaced grooves of the brackets to allow rotational motion of said clamp arm; and said linkage means includes a drive link having a first pivotal connection to the second end of the piston rod at a first axis and a second pivotal connection to an anchor link at a second axis, said pivotal connection at the second axis slidingly cooperates with a drive ratchet in a linear slot, said anchor link having a second pivotal connection to said housing at a third axis, said drive ratchet further including a pivotal connection to said housing at a fourth axis, said linear slot is perpendicular to said fourth axis, said piston rod having a retracted position with the first, second and fourth axes establishing a plane perpendicular to a plane established by the second and third axes, and said piston rod having an extended position with the second and third axes establishing a plane parallel to a plane established by the first and fourth axes.

3. An enclosed fluid-actuated clamp comprising:

a cylinder having a fluid chamber therein and a pair of fluid ports longitudinally spaced from one another in fluid communication with said fluid chamber;

a piston sealingly disposed for slidable, longitudinal movement within said fluid chamber between said fluid ports in order to selectively move said piston longitudinally in response to respective greater and lesser fluid pressures in one of said fluid ports with respect to the other of said fluid ports;

a piston rod with a first end removably attached to said piston;

a body with a longitudinal bore to receive said piston rod and a cavity communicating with said bore;

two brackets on opposing sides of said body to removably secure the body to said cylinder and to fluidly seal said bore and cavity, each bracket having circumferentially-spaced grooves;

a drive link having a first pivotal connection to the second end of the piston rod at a first axis and a second pivotal connection to an anchor link at a second axis, said pivotal connection at the second axis slidingly cooperates with a drive ratchet in a linear slot, said anchor link having a second pivotal connection to said housing at a third axis, said drive ratchet further including a pivotal connection to said housing at a fourth axis, said linear slot is perpendicular to said fourth axis, said piston rod having a retracted position with the first, second and fourth axes establishing a plane perpendicular to a plane established by the second and third axes, and said piston rod having an extended position with the second and third axes establishing a plane parallel to a plane established by the first and fourth axes; and at least one clamp arm removably secured to said drive ratchet outside the brackets by a securing means cooperating through the circumferentially-spaced grooves of the brackets to allow rotational motion of said clamp arm.

4. The enclosed fluid-actuated clamp of claim 3 further comprising two clamp arms aligned relative to the other on opposing sides of said brackets.

5. The enclosed fluid-actuated clamp of claim 4 further includes nylon washers secured between the clamp arms and brackets to provide a fluid-tight seal at the circumferentially-spaced grooves of said brackets.

6. The enclosed fluid-actuated clamp of claim 3 wherein said piston is pneumatically powered.

* * * * *